(12) United States Patent
Wu et al.

(10) Patent No.: US 11,870,382 B2
(45) Date of Patent: Jan. 9, 2024

(54) MATRIX POWER CONVERSION DEVICE AND CONTROL METHOD THEREOF

(71) Applicant: Delta Electronics, Inc., Taoyuan (TW)

(72) Inventors: Ping-Heng Wu, Taoyuan (TW);
Kai-Wei Hu, Taoyuan (TW);
Lei-Chung Hsing, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 17/577,953

(22) Filed: Jan. 18, 2022

(65) Prior Publication Data

US 2023/0067581 A1 Mar. 2, 2023

(30) Foreign Application Priority Data

Sep. 1, 2021 (CN) .......................... 202111022954.9

(51) Int. Cl.
*H02M 5/27* (2006.01)
*H02M 1/12* (2006.01)
(Continued)

(52) U.S. Cl.
CPC .......... *H02P 27/16* (2013.01); *H02M 1/4216* (2013.01); *H02M 5/2932* (2021.05)

(58) Field of Classification Search
CPC ...................................................... H02P 27/16
See application file for complete search history.

(56) References Cited

U.S. PATENT DOCUMENTS 5,949,672 A 9/1999 Bernet
9,531,317 B2 12/2016 Kudoh et al.
(Continued)

FOREIGN PATENT DOCUMENTS

CN 104638935 A 5/2015
CN 105391309 A 3/2016
(Continued)

OTHER PUBLICATIONS

L. Rmili et al., A Comprehensive Analysis of Matrix Converters: Bidirectional Switch, Direct Topology, Modeling and Control, IEEE, 2014, pp. 313-318.
(Continued)

*Primary Examiner* — Kawing Chan
*Assistant Examiner* — Charles S Laughlin
(74) *Attorney, Agent, or Firm* — KIRTON McCONKIE; Evan R. Witt

(57) ABSTRACT

A matrix power conversion device including a plurality of three-phase switching modules and a controller is provided. Each three-phase switching module includes a plurality of bidirectional switches connected to the input phase voltages of the three-phase input power respectively and outputs a corresponding output phase voltage of the three-phase output power. The controller determines a maximum voltage, an intermediate voltage and a minimum voltage among all the input phase voltages to acquire a waveform of a control carrier wave in a switching cycle. The controller acquires output expected values corresponding to all output phase voltages and compares them with the waveform of the control carrier wave for acquiring a turning-on time of each of the plurality of bidirectional switches. Accordingly, the controller controls the matrix power conversion device to switch the three-phase input power so as to change the three-phase output power for driving the motor.

11 Claims, 13 Drawing Sheets

(51) Int. Cl.
*H02P 27/16* (2006.01)
*H02M 5/293* (2006.01)
*H02M 1/42* (2007.01)

(56) References Cited

U.S. PATENT DOCUMENTS

2008/0285314 A1\* 11/2008 Kojori ................... H02M 1/32
363/37
2015/0130431 A1\* 5/2015 Yamazaki ............ H02M 5/293
323/272

FOREIGN PATENT DOCUMENTS

| CN | 105471275 A | 4/2016 |
| CN | 104253538 B | 4/2017 |
| GB | 2458726 A | 11/2006 |
| TW | 201308860 A1 | 2/2013 |

OTHER PUBLICATIONS

Chengzhu Piao et al., A Unified Carrier-Based Modulation Method for Direct Matrix Converter, IEEE, 2015, pp. 122-128.

\* cited by examiner

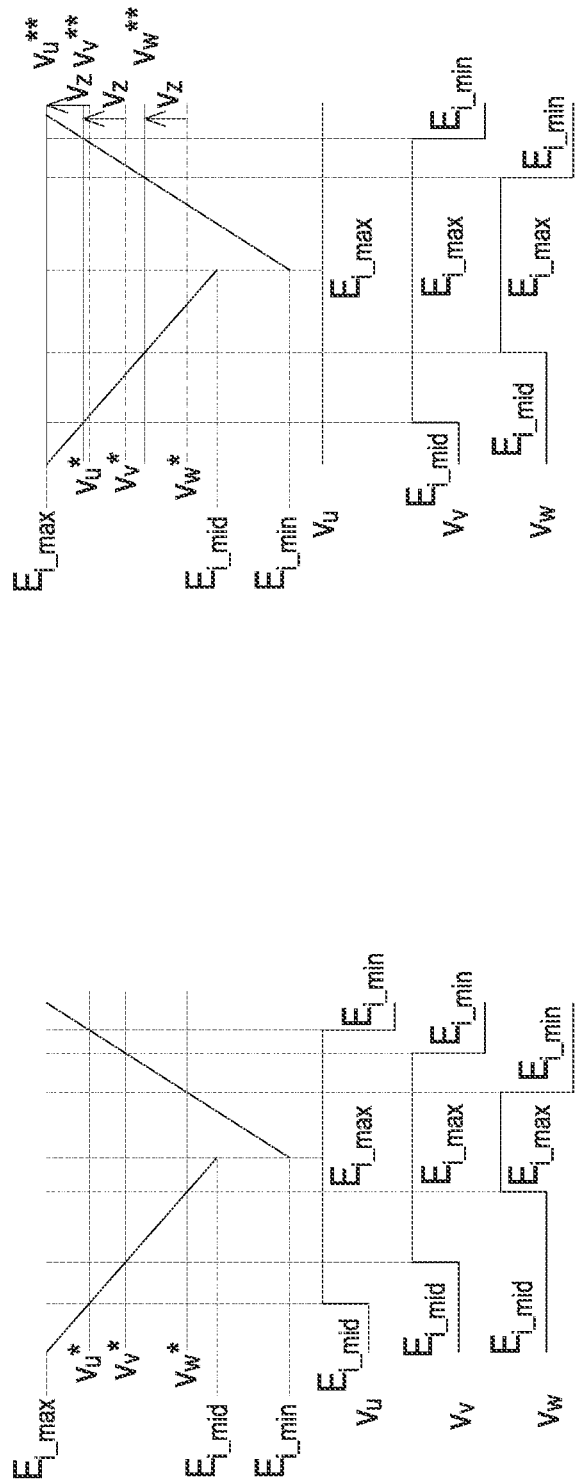

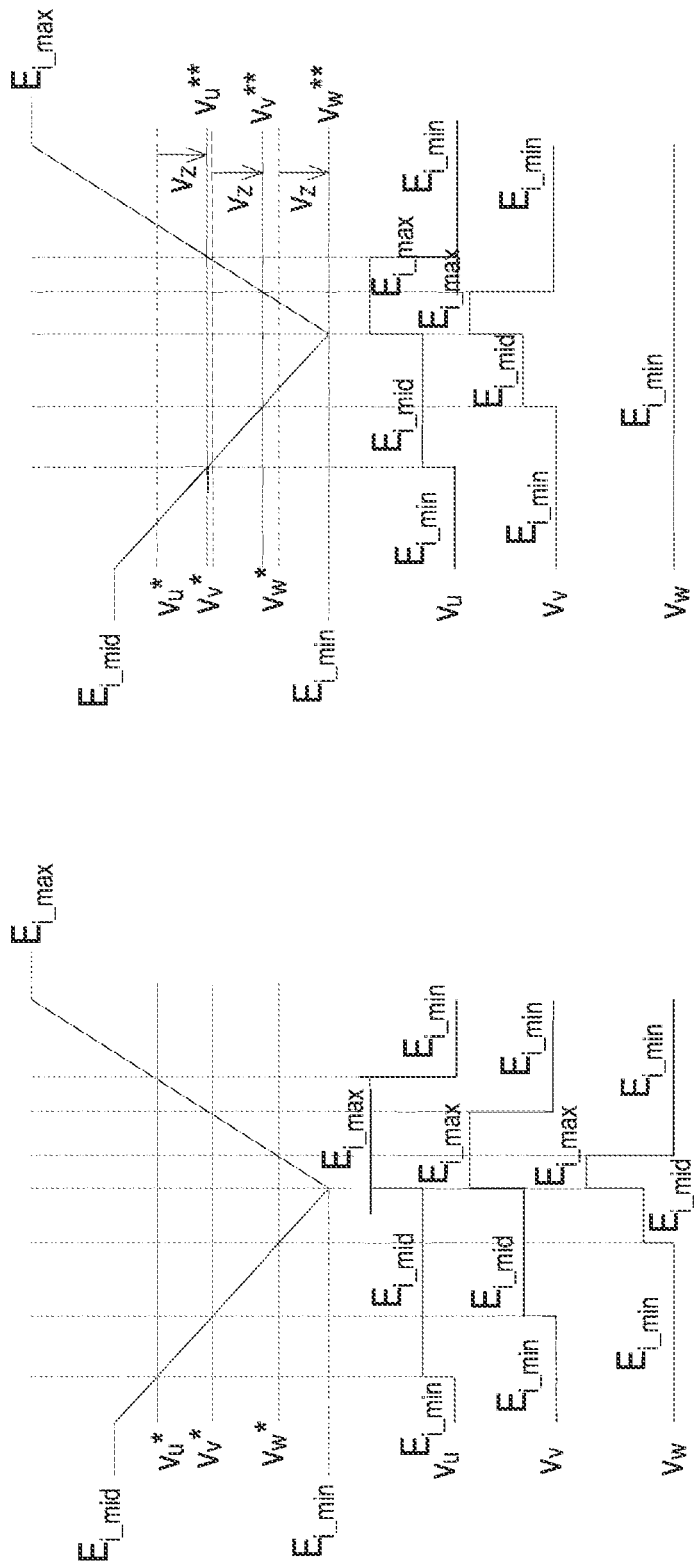

MATRIX POWER CONVERSION DEVICE AND CONTROL METHOD THEREOF

CROSS-REFERENCE TO RELATED APPLICATION

This application claims priority to China Patent Application No. 202111022954.9, filed on Sep. 1, 2021, the entire contents of which are incorporated herein by reference for all purposes.

FIELD OF THE INVENTION

The present disclosure relates to a power conversion device and a control method thereof, and more particularly to a matrix power conversion device and a control method thereof.

BACKGROUND OF THE INVENTION

In various industrial applications of motor drive, the drive should be connected to an AC power source. As shown in FIG. 1, the AC power is converted into a DC-link capacitor voltage through a diode rectifier or an active-front-end, and then the drive converts the DC power to the AC motor side. In this structure, the energy conversion process is in order of AC, DC and AC. However, in this model, a DC capacitor needs to be provided as a relay buffer for energy, which makes the overall volume larger and causes the efficiency to decrease.

Therefore, there is a need of providing a matrix power conversion device and a control method thereof to obviate the drawbacks encountered from the prior arts.

SUMMARY OF THE INVENTION

It is an objective of the present disclosure to provide a matrix power conversion device and a control method thereof. Through the operation of a plurality of bidirectional switches in the matrix power conversion device, an AC power at the input side is directly converted into an AC power at the output side. There is no need to dispose an additional DC capacitor as relay buffer. Consequently, by the matrix power conversion device and the control thereof of the present disclosure, the matrix power conversion device with smaller volume, better efficiency and longer lifespan is realized. In addition, the present disclosure utilizes carrier wave to control the bidirectional switches of the matrix power conversion device, so as to realize the synthesis of output voltage and output current.

In accordance with an aspect of the present disclosure, there is provided a matrix power conversion device coupled between a three-phase input power and a motor. The matrix power conversion device includes a plurality of three-phase switching modules and a controller. The plurality of three-phase switching modules switches the three-phase input power to generate a three-phase output power. Each three-phase switching module includes a plurality of bidirectional switches, each bidirectional switch of each three-phase switching module is connected to a corresponding input phase voltage of the three-phase input power, and each three-phase switching module outputs a corresponding output phase voltage of the three-phase output power. The controller acquires all input phase voltages of the three-phase input power, and determines a maximum voltage, an intermediate voltage and a minimum voltage among all the input phase voltages to acquire a waveform of a control carrier wave in a switching cycle. The controller acquires output expected values corresponding to all output phase voltages of the three-phase output power. The controller compares the waveform of the control carrier wave with all the output expected values respectively for acquiring a turning-on time of each of the plurality of bidirectional switches. According to the turning-on time of each of the plurality of bidirectional switches, the controller controls the matrix power conversion device to switch the three-phase input power so as to change the three-phase output power for driving the motor.

In accordance with another aspect of the present disclosure, there is provided a control method for a matrix power conversion device. The matrix power conversion device includes a plurality of three-phase switching modules and a controller. The plurality of three-phase switching modules switches the three-phase input power to generate a three-phase output power. Each three-phase switching module includes a plurality of bidirectional switches, each bidirectional switch in each three-phase switching module is connected to a corresponding input phase voltage of the three-phase input power, and each three-phase switching module outputs a corresponding output phase voltage of the three-phase output power. The control method includes: acquiring all input phase voltages of the three-phase input power; determining a maximum voltage, an intermediate voltage and a minimum voltage among all the input phase voltages to acquire a waveform of a control carrier wave in a switching cycle; acquiring output expected values corresponding to all output phase voltages of the three-phase output power respectively; comparing the waveform of the control carrier wave with all the output expected values respectively for acquiring a turning-on time of each of the plurality of bidirectional switches; and switching the three-phase input power to change the three-phase output power for driving a motor according to the turning-on time of each bidirectional switch.

BRIEF DESCRIPTION OF THE DRAWINGS

FIG. 9A schematically shows the waveforms of the control carrier wave, the three-phase output expected values and the output phase voltages in one switching cycle during the base voltage command being in the positive interval;

FIG. 9B shows the waveforms of the three-phase output expected values of FIG. 9A after zero sequence injection;

FIG. 10A schematically shows the waveforms of the control carrier wave, the three-phase output expected values and the output phase voltages in one switching cycle during the base voltage command being in the negative interval;

FIG. 10B shows the waveforms of the three-phase output expected values of FIG. 10A after zero sequence injection;

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
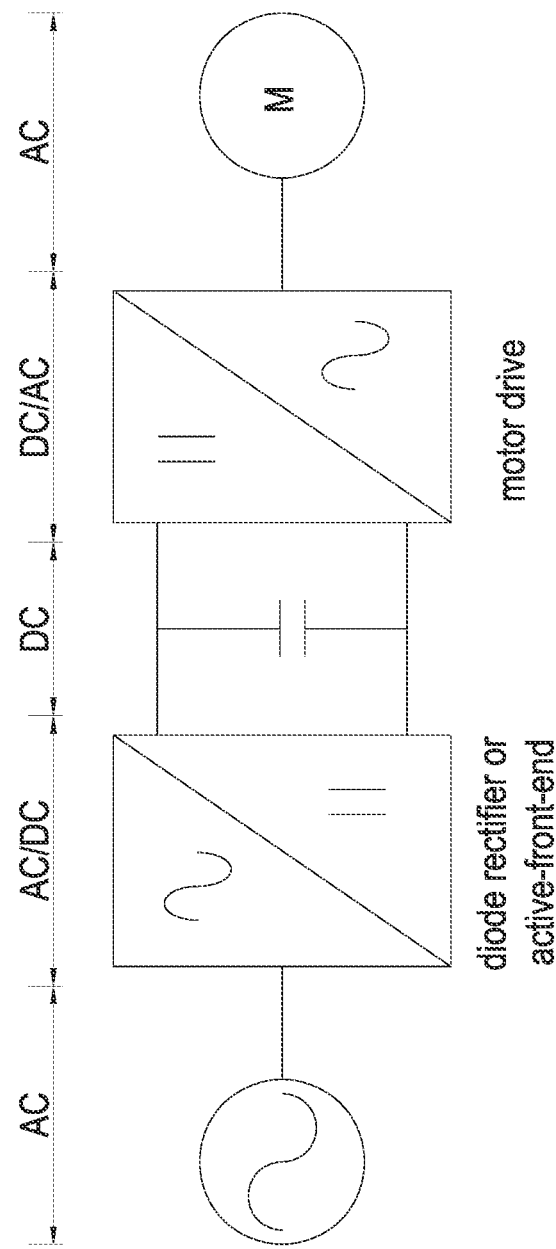
FIG. 1 a schematic diagram showing the application of the conventional motor and motor drive.
Figure 2:
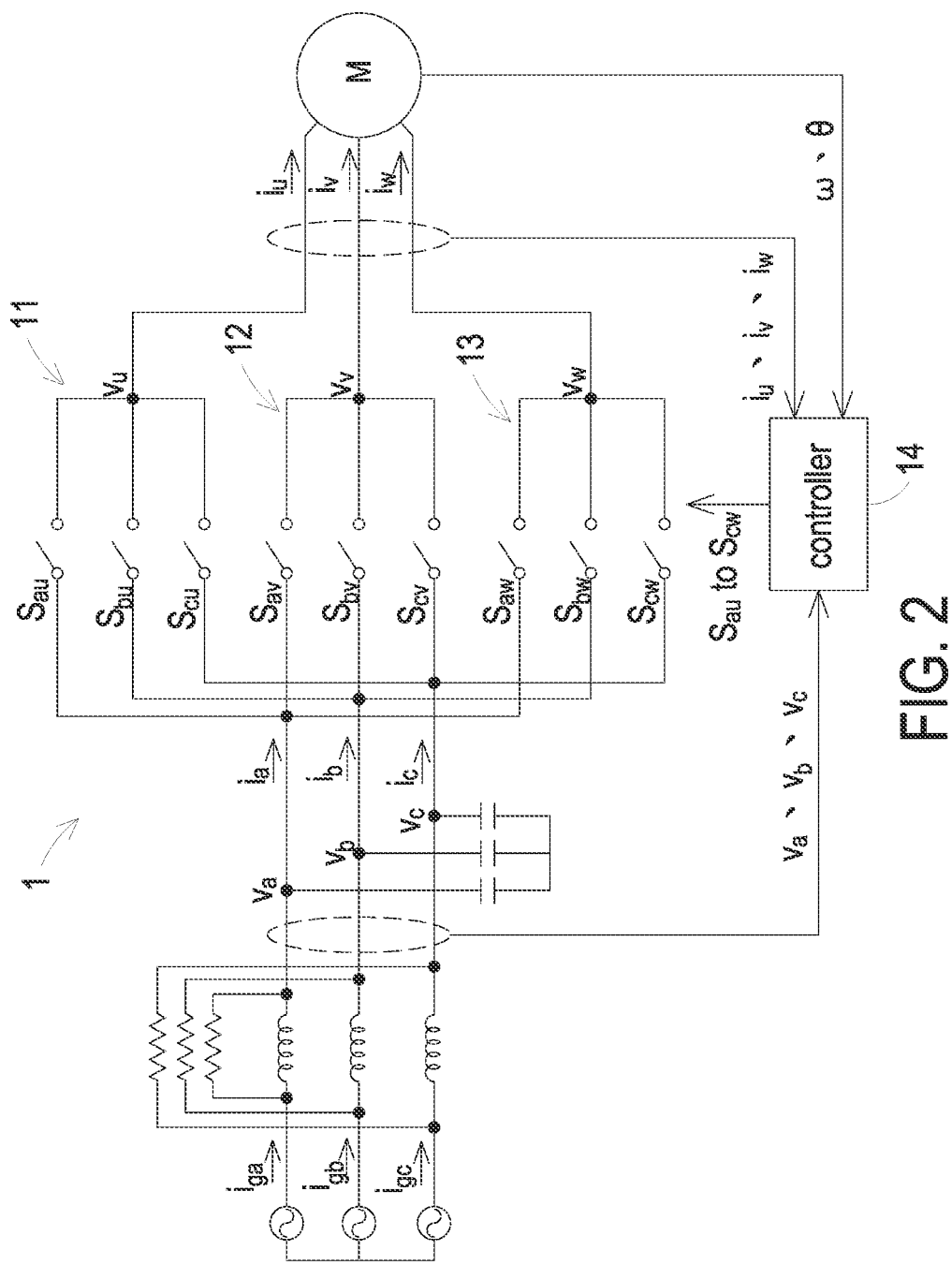
FIG. 2 is a schematic circuit diagram illustrating a matrix power conversion device according to an embodiment of the present disclosure.

FIG. 2 is a schematic circuit diagram illustrating a matrix power conversion device according to an embodiment of the present disclosure. As shown in FIG. 2, the matrix power conversion device 1 is coupled between a three-phase input power and a motor M. The matrix power conversion device 1 includes a plurality of three-phase switching modules 11, 12 and 13 and a controller 14. The plurality of three-phase switching modules 11, 12, and 13 switches the three-phase input power to generate a three-phase output power. Each three-phase switching module includes a plurality of bidirectional switches ($S_{au}$, $S_{bu}$, $S_{cu}$, $S_{av}$, $S_{bv}$, $S_{cv}$, $S_{aw}$, $S_{bw}$, $S_{cw}$), and each bidirectional switch in each three-phase switching module (11, 12, 13) is connected to the corresponding input phase voltage of the three-phase input power. Further, each three-phase switching module outputs the corresponding output phase voltage of the three-phase output power. For example, the three-phase switching module 11 includes bidirectional switches $S_{au}$, $S_{bu}$ and $S_{cu}$ connected to input phase voltages $v_a$, $v_b$ and $v_c$ of the three-phase input power respectively; the three-phase switching module 12 includes bidirectional switches $S_{av}$, $S_{bv}$ and $S_{cv}$ connected to input phase voltages $v_a$, $v_b$ and $v_c$ of the three-phase input power respectively; and the three-phase switching module 13 includes bidirectional switches $S_{aw}$, $S_{bw}$ and $S_{cw}$ connected to input phase voltages $v_a$, $v_b$ and $v_w$ of the three-phase input power respectively. Moreover, the three-phase switching modules 11, 12 and 13 output the output phase voltages $v_u$, $v_v$ and $v_w$ of the three-phase output power respectively. In this embodiment, the number of the three-phase switching modules, the input phase voltages, and the output phase voltages are all equal to three, but the present disclosure is not limited thereto.

Figure 3:
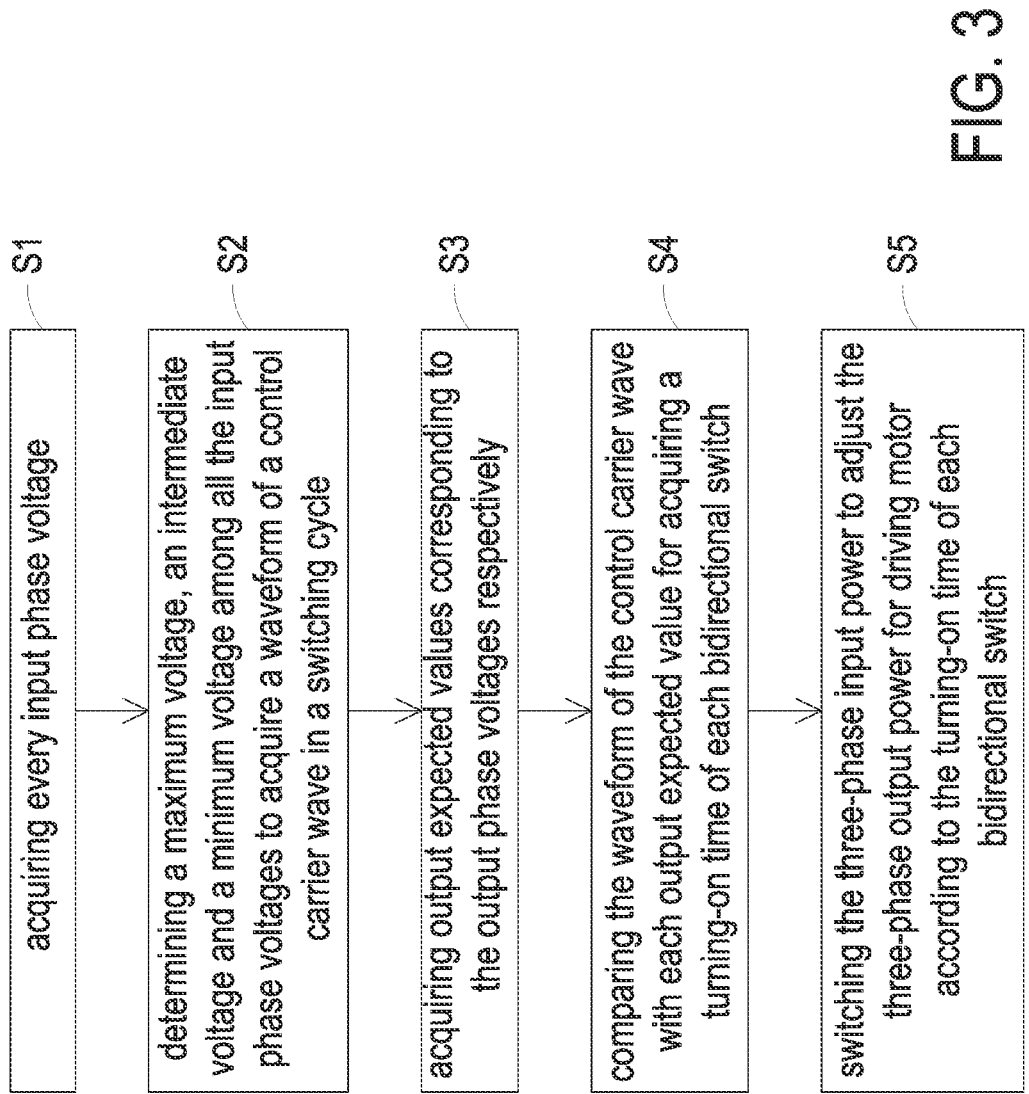
FIG. 3 is a schematic flow chart illustrating a control method of the matrix power conversion device according to an embodiment of the present disclosure.

Please refer to FIG. 2 and FIG. 3. FIG. 3 is a schematic flow chart illustrating a control method of the matrix power conversion device according to an embodiment of the present disclosure. In the present disclosure, the controller 14 of FIG. 2 is utilized to perform the control method of FIG. 3, so as to implement the control for the matrix power conversion device and the three-phase switching modules 11, 12 and 13 thereof. As shown in FIG. 2 and FIG. 3, firstly, the controller 14 acquires all input phase voltages $v_a$, $v_b$ and $v_c$ (Step S1), and determines a maximum voltage, an intermediate voltage and a minimum voltage among the input phase voltages $v_a$, $v_b$ and $v_c$ to acquire a waveform of a control carrier wave in a switching cycle (Step S2). Then, the controller 14 acquires output expected values corresponding to the output phase voltages $v_u$, $v_v$ and $v_w$ respectively (Step S3). Afterwards, the controller 14 compares the waveform of the control carrier wave with the output expected values corresponding to the output phase voltage $v_u$, $v_v$ and $v_w$ respectively for acquiring the turning-on time of each of the bidirectional switches $S_{au}$, $S_{bu}$, $S_{cu}$, $S_{av}$, $S_{bv}$, $S_{cv}$, $S_{aw}$, $S_{bw}$ and $S_{cw}$ in the switching cycle (Step S4). Finally, according to the turning-on time of each bidirectional switch $S_{au}$ to $S_{cw}$, the controller 14 outputs control signals for controlling all the bidirectional switch $S_{au}$ to $S_{cw}$, thereby controlling the matrix power conversion device 1 to switch the three-phase input power to adjust the three-phase output power for driving the motor M (Step S5). In an embodiment, the controller 14 further receives an angular speed ω and an angle θ of the motor M operating to obtain the operating status of the motor M.

Therefore, through the plurality of bidirectional switches $S_{au}$ to $S_{cw}$ of the matrix power conversion device 1, the AC power at the input side can be directly converted into the AC power at the output side. There is no need to dispose an additional DC capacitor as relay buffer. Consequently, by the matrix power conversion device 1 and the control method thereof of the present disclosure, the matrix power conversion device 1 with smaller volume, better efficiency and longer lifespan is implemented.

Figure 4:
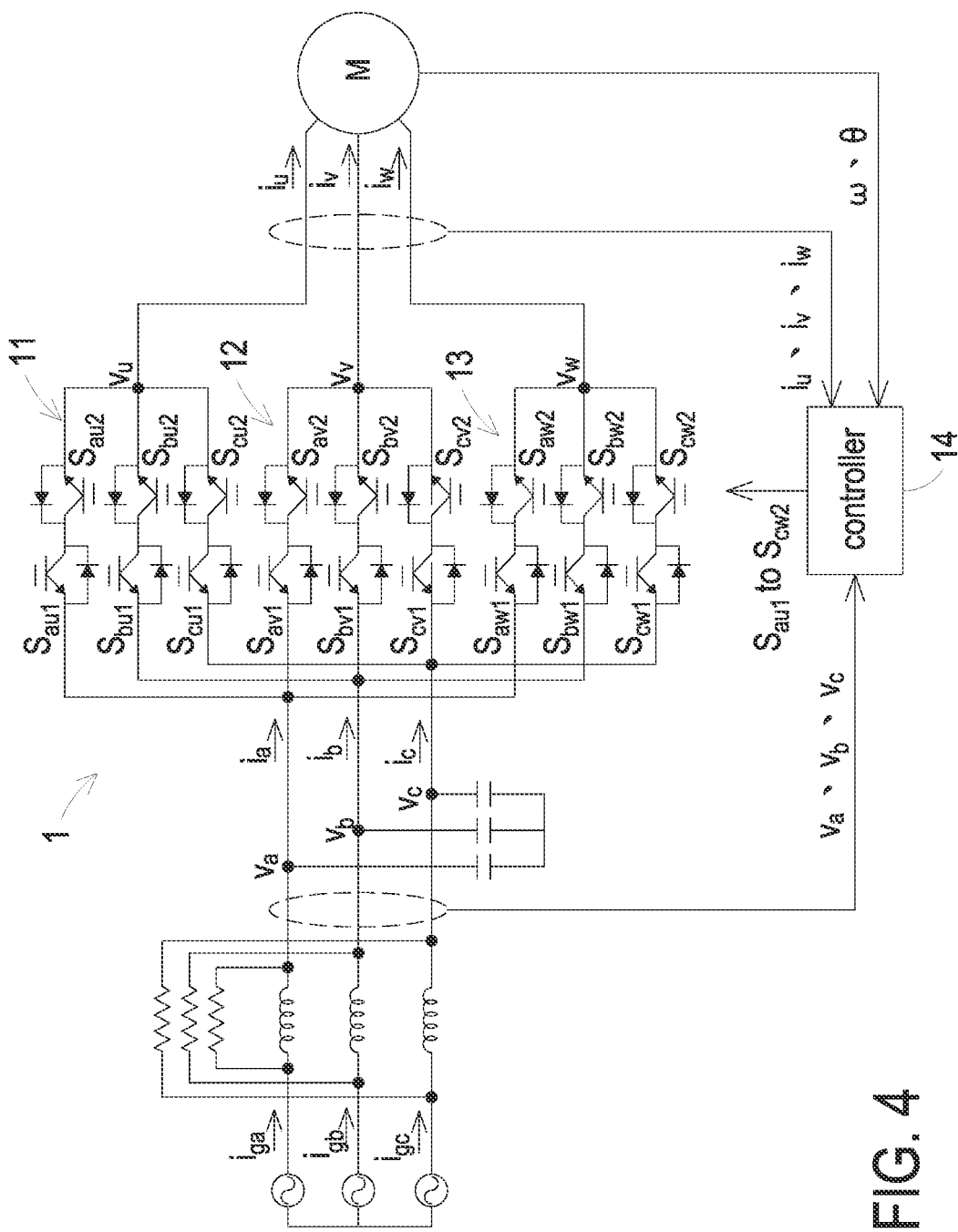
FIG. 4 schematically shows a specific structure of the bidirectional switches of FIG. 2.

In addition, FIG. 4 shows a specific structure of the bidirectional switches $S_{au}$ to $S_{cw}$. As shown in FIG. 4, each bidirectional switch includes two switches connected in series. In particular, the bidirectional switch $S_{au}$ includes switches $S_{au1}$ and $S_{au2}$ connected in series, the bidirectional switch $S_{bu}$ includes switches $S_{bu1}$ and $S_{bu2}$ connected in series, and so on, the bidirectional switch $S_{cw}$ includes switches $S_{cw1}$ and $S_{cw2}$ connected in series. Correspondingly, the controller 14 outputs the control signals of the switches $S_{au1}$ to $S_{cw2}$ in order to implement the control for the switches $S_{au1}$ to $S_{cw2}$. Generally, the control signals of the two switches in any bidirectional switch are the same, and are only slightly out of phase with respect to each other during transient switching so as to avoid input short circuit or output open circuit.

The following would describe how to utilize a control carrier wave to control the bidirectional switches $S_{au}$ to $S_{cw}$ of the matrix power conversion device 1 for implementing the synthesis of the output voltage and input current. It should be noted that the control described as follows is performed by the controller 14 of FIG. 2.

As shown in FIG. 2, each phase at the output side is connected to the three-phase input power through the three bidirectional switches of the corresponding three-phase switching module. Therefore, the average output phase voltages $v_u$, $v_v$ and $v_w$ in a switching cycle are defined as:

$$v_u = D_{au} \cdot v_a + D_{bu} \cdot v_b + D_{cu} \cdot v_c$$

$$v_v = D_{av} \cdot v_a + D_{bv} \cdot v_b + D_{cv} \cdot v_c$$

$$v_w = D_{aw} \cdot v_a + D_{bw} \cdot v_b + D_{cw} \cdot v_c \qquad (1),$$

where $D_{au}$ to $D_{cw}$ are duty ratios of the control signals of the bidirectional switches $S_{au}$ to $S_{cw}$ respectively, namely $D_{au}$ to $D_{cw}$ are ratios of the turning-on time of the bidirectional switches $S_{au}$ to $S_{cw}$ in one switching cycle. The input phase currents $i_a$, $i_b$ and $i_c$ of the three-phase input power are defined as:

$$i_a = D_{au} \cdot i_u + D_{av} \cdot i_v + D_{aw} \cdot i_w$$

$$i_b = D_{bu} \cdot i_u + D_{bv} \cdot i_v + D_{bw} \cdot i_w$$

$$i_c = D_{cu} \cdot i_u + D_{cv} \cdot i_v + D_{cw} \cdot i_w \qquad (2),$$

where $i_u$, $i_v$ and $i_w$ are the output phase currents of the three-phase output power.

Accordingly, the output phase voltages $v_u$, $v_v$ and $v_w$ can be synthesized from the input phase voltages $v_a$, $v_b$ and $v_c$, and the input phase currents $i_a$, $i_b$ and $i_c$ can be synthesized from the output phase currents $i_u$, $i_v$ and $i_w$. It is noted that in each of the three-phase switching modules 11, 12 and 13 at any time, there must be one bidirectional switch in an on state and the other bidirectional switches in an off state. In other words, in each of the three-phase switching modules 11, 12 and 13, there cannot be multiple bidirectional switches in the on state simultaneously so as to avoid overcurrent caused by the short circuit at the input side, and all the bidirectional switches cannot be in the off state simultaneously so as to avoid overvoltage caused by the open circuit at the output side. The said limitation of switching the bidirectional switches can be expressed as follows:

$$S_{au} + S_{bu} + S_{cu} = 1$$

$$S_{av} + S_{bv} + S_{cv} = 1$$

$$S_{aw} + S_{bw} + S_{cw} = 1 \qquad (3).$$

In equation (3), when $S_{au}$ equals 1, it means that the bidirectional switch $S_{au}$ is in the on state; and when $S_{au}$ equals 0, it means that the bidirectional switch $S_{au}$ is in the off state. Similarly, $S_{bu}$ to $S_{cw}$ in equation (3) reflects the on or off state of the other bidirectional switches $S_{bu}$ to $S_{cw}$.

It can be seen from the above descriptions that the output phase voltages $v_u$, $v_v$ and $v_w$ of the matrix power conversion device 1 are synthesized from the input phase voltages $v_a$, $v_b$ and $v_c$ through the switching combination of the bidirectional switches. In order to facilitate the description and understanding, only one output phase is analyzed as follows since the control and operation principles for each output phase are similar.

Figure 5:
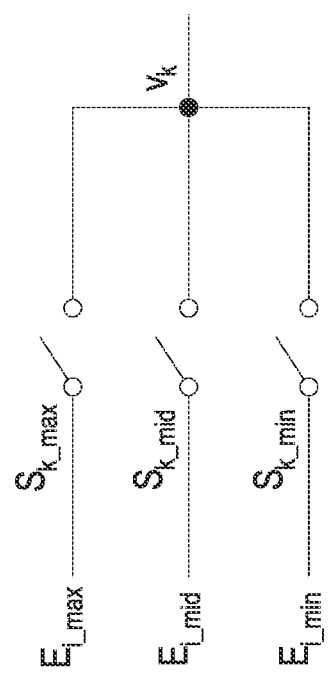
FIG. 5 shows the equivalent circuit of a three-phase switching module in one switching cycle.

FIG. 5 shows the equivalent circuit of a three-phase switching module in one switching cycle. In FIG. 5, $v_k$ represents any of the output phase voltages, where k can be u, v or w. Furthermore, all the input phase voltages $v_a$, $v_b$ and $v_c$ in FIG. 2 are compared with each other, and $E_{i\_max}$, $E_{i\_mid}$ and $E_{i\_min}$ in FIG. 5 respectively represents the maximum voltage, the intermediate voltage and the minimum voltage among the input phase voltages $v_a$, $v_b$ and $v_c$. The bidirectional switches $S_{k\_max}$, $S_{k\_mid}$ and $S_{k\_min}$ are connected to the input phase voltages corresponding to the maximum voltage $E_{i\_max}$, the intermediate voltage $E_{i\_mid}$ and the minimum voltage $E_{i\_min}$ respectively. As mentioned above, in each three-phase switching module at any time, there is only one bidirectional switch in the on state. Therefore, the output phase voltage $v_k$ is determined by the duty ratios of the bidirectional switches $S_{k\_max}$, $S_{k\_mid}$ and $S_{k\_min}$ in one switching cycle, as shown in equation (4):

$$v_k = D_{k\_max} \cdot E_{i\_max} + D_{k\_mid} \cdot E_{i\_mid} + D_{k\_min} \cdot E_{i\_min} \qquad (4).$$

The turning-on time of the bidirectional switches $S_{k\_max}$, $S_{k\_mid}$ and $S_{k\_min}$ are corresponding to the maximum duty ratio $D_{k\_max}$, the intermediate duty ratio $D_{k\_mid}$ and the minimum duty ratio $D_{k\_min}$ respectively. The sum of the maximum duty ratio $D_{k\_max}$, the intermediate duty ratio $D_{k\_mid}$ and the minimum duty ratio $D_{k\_min}$ equals 1.

Accordingly, once the appropriate duty ratios are determined, the required output phase voltages can be synthesized. In the present disclosure, the appropriate duty ratios of all the bidirectional switches are acquired based on the control carrier wave, and the required output phase voltages can be synthesized accordingly, which is described specifically as follows.

Figure 6:
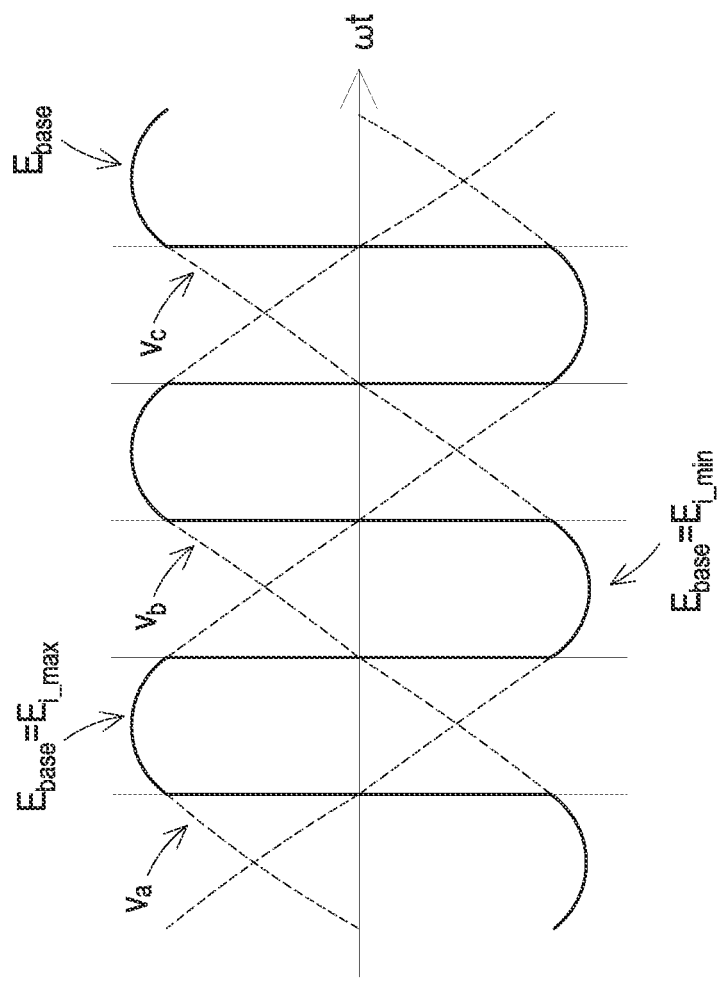
FIG. 6 is a schematic oscillogram showing the input phase voltages and the base voltage command of FIG. 2.

In order to achieve the best voltage utilization, firstly, it is necessary to determine the magnitude relations among the input phase voltages $v_a$, $v_b$ and $v_c$ in each time interval. FIG. 6 is a schematic oscillogram showing the input phase voltages and the base voltage command. In FIG. 6, the waveforms of the input phase voltages $v_a$, $v_b$ and $v_c$ are all sinusoidal and are depicted by dashed lines. In addition, each of the input phase voltages $v_a$, $v_b$ and $v_c$ of the three-phase input power is captured according to a preset phase, and the input phase voltage with the largest absolute voltage value is regarded as the base voltage command $E_{base}$. In FIG. 6, the waveform of the base voltage command $E_{base}$ is depicted by solid line. The preset phase is for example but not limited to 30 degrees or $\pi/6$ radians. Through the output phase voltages synthesized based on the voltage command $E_{base}$, the best voltage utilization is achieved. As shown in FIG. 6, the positive interval is defined as the time interval in which the base voltage command $E_{base}$ is positive, and the base voltage command $E_{base}$ is equal to the maximum voltage $E_{i\_max}$ in the positive interval. On the contrary, the negative interval is defined as the time interval in which the base voltage command $E_{base}$ is negative, and the base voltage command $E_{base}$ is equal to the minimum voltage $E_{i\_min}$ in the negative interval.

Figure 7A:
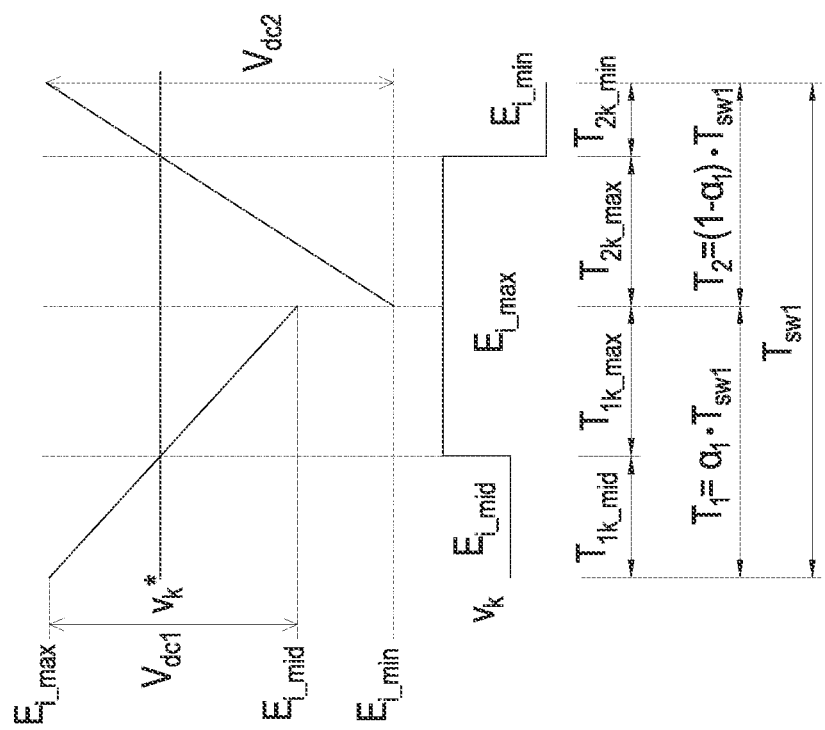
FIG. 7A is a schematic oscillogram showing the control carrier wave, the output expected value and the output phase voltage in one switching cycle during the base voltage command of FIG. 6 being in the positive interval.
Figure 7B:
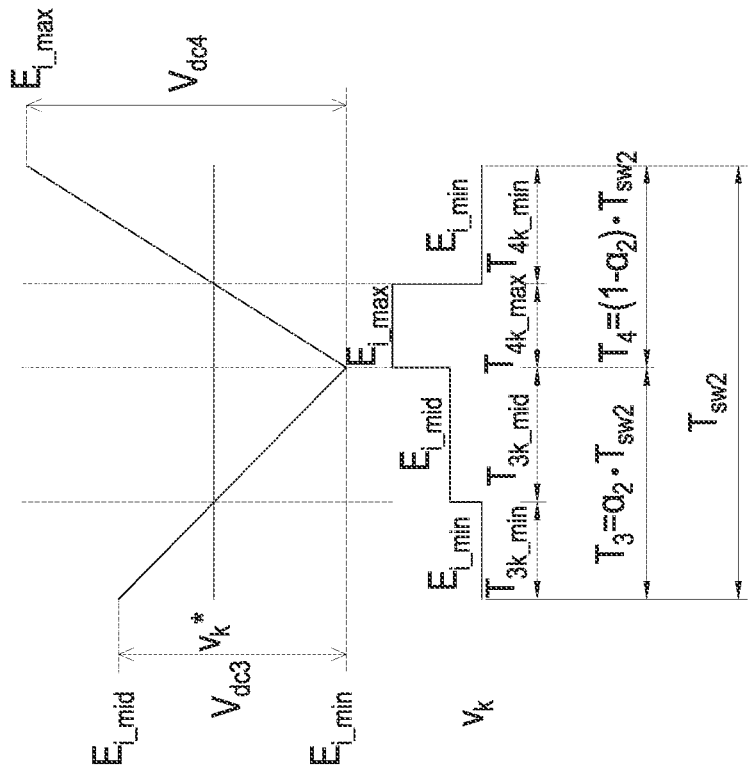
FIG. 7B is a schematic oscillogram showing the control carrier wave, the output expected value and the output phase voltage in one switching cycle during the base voltage command of FIG. 6 being in the negative interval.

FIG. 7A is a schematic oscillogram showing the control carrier wave, the output expected value and the output phase voltage in one switching cycle during the base voltage command $E_{base}$ being in the positive interval. FIG. 7B is a schematic oscillogram showing the control carrier wave, the output expected value and the output phase voltage in one switching cycle during the base voltage command $E_{base}$ being in the negative interval. In FIG. 7A and FIG. 7B, $v_k$ can be any output phase voltage, $v_k^*$ is the output expected value corresponding to the output phase voltage $v_k$. In the present disclosure, through controlling the bidirectional switches by the control carrier wave, the average value of the output phase voltage $v_k$ in one switching cycle is equal to the corresponding output expected value $v_k^*$.

As shown in FIG. 7A, when the base voltage command $E_{base}$ is in the positive interval (i.e., $E_{base} = E_{i\_max}$), the waveform of the control carrier wave includes a first linear carrier wave and a second linear carrier wave. The cycle variation of the first linear carrier wave is the first switching interval $T_1$ of the switching cycle $T_{sw1}$, and the first switching interval $T_1$ is equal to the product of a time ratio value $\alpha_1$ and the switching cycle $T_{sw1}$ (i.e., $T_1 = \alpha_1 \cdot T_{sw1}$). The cycle variation of the second linear carrier wave is the second switching interval $T_2$ of the switching cycle $T_{sw1}$, and the second switching interval $T_2$ is equal to the difference between the switching cycle $T_{sw1}$ and the first switching interval $T_1$ (i.e., $T_2 = (1 - \alpha_1) \cdot T_{sw1}$).

The slope of the first linear carrier wave is negative. During the first switching interval $T_1$, there is a first voltage difference $V_{dc1}$ between the maximum voltage $E_{i\_max}$ and the intermediate voltage $E_{i\_mid}$, and the first voltage difference $V_{dc1}$ is the voltage variation of the first linear carrier wave. In addition, during the first switching interval $T_1$, when the first linear carrier wave is greater than the output expected value $v_k^*$, the bidirectional switch $S_{k\_mid}$ is in the on state so that the output phase voltage $v_k$ is equal to the intermediate voltage $E_{i\_mid}$, and the turning-on time of the bidirectional switch $S_{k\_mid}$ is $T_{1k\_mid}$. When the first linear carrier wave is less than the output expected value $v_k^*$, the bidirectional switch $S_{k\_max}$ is in the on state so that the output phase voltage $v_k$ is equal to the maximum voltage $E_{i\_max}$, and the turning-on time of the bidirectional switch $S_{k\_max}$ is $T_{1k\_max}$.

The slope of the second linear carrier wave is positive. During the second switching interval $T_2$, there is a second voltage difference $V_{dc2}$ between the maximum voltage $E_{i\_max}$ and the minimum voltage $E_{i\_min}$, and the second voltage difference $V_{dc2}$ is the voltage variation of the second linear carrier wave. In addition, during the second switching interval $T_2$, when the second linear carrier wave is less than the output expected value $v_k^*$, the bidirectional switch $S_{k\_max}$ is in the on state so that the output phase voltage $v_k$ is equal to the maximum voltage $E_{i\_max}$, and the turning-on time of the bidirectional switch $S_{k\_max}$ is $T_{2k\_max}$. When the second linear carrier wave is greater than the output expected value $v_k^*$, the bidirectional switch $S_{k\_min}$ is in the on state so that the output phase voltage $v_k$ is equal to the minimum voltage $E_{i\_min}$, and the turning-on time of the bidirectional switch $S_{k\_min}$ is $T_{2k\_min}$.

According to the waveforms shown in FIG. 7A, the turning-on time of each interval is derived as:

$$T_{1k\_max} = \frac{T_1}{V_{dc1}}(v_k^* - E_{i\_mid})$$
$$T_{2k\_max} = \frac{T_2}{V_{dc2}}(v_k^* - E_{i\_min})$$
$$T_{1k\_mid} = \frac{T_1}{V_{dc1}}(E_{i\_max} - v_k^*)$$
$$T_{2k\_min} = \frac{T_2}{V_{dc2}}(E_{i\_max} - v_k^*)$$

(5)

In addition, according to the turning-on time of each bidirectional switches in one switching cycle $T_{sw1}$, the average output phase voltage $v_k$ in one switching cycle $T_{sw1}$ is calculated as:

$$v_k = \frac{T_{1k\_max}E_{i\_max} + T_{2k\_max}E_{i\_max} + T_{1k\_mid}E_{i_{mid}} + T_{2k\_min}E_{i\_min}}{T_{sw1}}.$$

(6)

Through substituting the equation (5) into the equation (6), it is derived that $v_k = v_k^*$, which proves that the average value of the output phase voltage $v_k$ in one switching cycle $T_{sw1}$ is equal to the output expected value $v_k^*$.

Therefore, when the base voltage command $E_{base}$ is in the positive interval (i.e., $E_{base} = E_{i\_max}$), the controller 14 retrieves the time of the first linear carrier wave being greater than the output expected value $v_k^*$ to acquire the corresponding intermediate duty ratio $D_{k\_mid}$. The turning-on time of the bidirectional switch $S_{k\_mid}$ corresponding to the intermediate voltage $E_{i\_mid}$ is corresponding to the intermediate duty ratio $D_{k\_mid}$. In addition, the controller 14 retrieves a first time of the first linear carrier wave being less than the output expected value $v_k^*$ and acquires a second time of the second linear carrier wave being less than the output expected value $v_k^*$. Further, the controller 14 adds the first time and the second time up to acquire the corresponding maximum duty ratio $D_{k\_max}$. The turning-on time of the bidirectional switch $S_{k\_max}$ corresponding to the maximum voltage $E_{i\_max}$ is corresponding to the maximum duty ratio $D_{k\_max}$. Furthermore, the controller 14 retrieves the time of the second linear carrier wave being greater than the output expected value $v_k^*$ to acquire the corresponding minimum duty ratio $D_{k\_min}$. The turning-on time of the bidirectional switch $S_{k\_min}$ corresponding to the minimum voltage $E_{i\_min}$ is corresponding to the minimum duty ratio $D_{k\_min}$.

On the other hand, as shown in FIG. 7B, when the base voltage command $E_{base}$ is in the negative interval (i.e., $E_{base} = E_{i\_min}$), the waveform of the control carrier wave includes a first linear carrier wave and a second linear carrier wave. The cycle variation of the first linear carrier wave is the first switching interval $T_3$ of the switching cycle $T_{sw2}$, and the first switching interval $T_3$ is equal to the product of a time ratio value $\alpha_2$ and the switching cycle $T_{sw2}$ (i.e., $T_3 = \alpha_2 \cdot T_{sw2}$). The cycle variation of the second linear carrier wave is the second switching interval $T_4$ of the switching cycle $T_{sw2}$, and the second switching interval $T_4$ is equal to the difference between the switching cycle $T_{sw2}$ and the first switching interval $T_3$ (i.e., $T_4 = (1 - \alpha_2) \cdot T_{sw2}$).

The slope of the first linear carrier wave is negative. During the first switching interval $T_3$, there is a third voltage difference $V_{dc3}$ between the intermediate voltage $E_{i\_mid}$ and the minimum voltage $E_{i\_min}$, and the third voltage difference $V_{dc3}$ is the voltage variation of the first linear carrier wave. In addition, during the first switching interval $T_3$, when the first linear carrier wave is greater than the output expected value $v_k^*$, the bidirectional switch $S_{k\_min}$ is in the on state so that the output phase voltage $v_k$ is equal to the minimum voltage $E_{i\_min}$, and the turning-on time of the bidirectional switch $S_{k\_min}$ is $T_{3k\_min}$. When the first linear carrier wave is less than the output expected value $v_k^*$, the bidirectional switch $S_{k\_mid}$ is in the on state so that the output phase voltage $v_k$ is equal to the intermediate voltage $E_{i\_mid}$, and the turning-on time of the bidirectional switch $S_{k\_mid}$ is $T_{3k\_mid}$.

The slope of the second linear carrier wave is positive. During the second switching interval $T_4$, there is a fourth voltage difference $V_{dc4}$ between the maximum voltage $E_{i\_max}$ and the minimum voltage $E_{i\_min}$, and the fourth voltage difference $V_{dc4}$ is the voltage variation of the second linear carrier wave. In addition, during the second switching interval $T_4$, when the second linear carrier wave is less than the output expected value $v_k^*$, the bidirectional switch $S_{k\_max}$ is in the on state so that the output phase voltage $v_k$ is equal to the maximum voltage $E_{i\_max}$, and the turning-on time of the bidirectional switch $S_{k\_max}$ is $T_{4k\_max}$. When the second linear carrier wave is greater than the output expected value $v_k^*$, the bidirectional switch $S_{k\_min}$ is in the on state so that the output phase voltage $v_k$ is equal to the minimum voltage $E_{i\_min}$, and the turning-on time of the bidirectional switch $S_{k\_min}$ is $T_{4k\_min}$.

According to the waveforms shown in FIG. 7B, the turning-on time of each interval is derived as:

$$T_{3k\_min} = \frac{T_3}{V_{dc3}}(-v_k^* + E_{i\_mid})$$
$$T_{4k\_min} = \frac{T_4}{V_{dc4}}(-v_k^* + E_{i\_max})$$
$$T_{3k\_mid} = \frac{T_3}{V_{dc3}}(-E_{i\_min} + v_k^*)$$
$$T_{4k\_max} = \frac{T_4}{V_{dc4}}(-E_{i\_min} + v_k^*)$$

(7)

In addition, according to the turning-on time of each bidirectional switches in one switching cycle $T_{sw1}$, the average output phase voltage $v_k$ in one switching cycle $T_{sw1}$ is calculated as:

$$v_k = \frac{T_{3k\_min}E_{i\_min} + T_{4k\_min}E_{i\_min} + T_{3k\_mid}E_{i\_mid} + T_{4k\_max}E_{i\_max}}{T_{sw2}}. \quad (8)$$

Through substituting the equation (7) into the equation (8), it is derived that $v_k=v_k^*$, which proves that the average value of the output phase voltage $v_k$ in one switching cycle $T_{sw2}$ is equal to the output expected value $v_k^*$.

Therefore, when the base voltage command $E_{base}$ is in the negative interval (i.e., $E_{base}=E_{i\_min}$), the controller 14 retrieves a first time of the first linear carrier wave being greater than the output expected value $v_k^*$ and acquires a second time of the second linear carrier wave being greater than the output expected value $v_k^*$. Further, the controller 14 adds the first time and the second time up to acquire the corresponding minimum duty ratio $D_{k\_min}$. The turning-on time of the bidirectional switch $S_{k\_min}$ corresponding to the minimum voltage $E_{i\_min}$ is corresponding to the minimum duty ratio $D_{k\_min}$. In addition, the controller 14 retrieves the time of the first linear carrier wave being less than the output expected value $v_k^*$ to acquire the corresponding intermediate duty ratio $D_{k\_mid}$. The turning-on time of the bidirectional switch $S_{k\_mid}$ corresponding to the intermediate voltage $E_{i\_mid}$ is corresponding to the intermediate duty ratio $D_{k\_mid}$ Furthermore, the controller 14 retrieves the time of the second linear carrier wave being less than the output expected value $v_k^*$ to acquire the corresponding maximum duty ratio $D_{k\_max}$. The turning-on time of the bidirectional switch $S_{k\_max}$ corresponding to the maximum voltage $E_{i\_max}$ is corresponding to the maximum duty ratio $D_{k\_max}$.

As known from the above descriptions, through the PWM (pulse width modulation) control signal generated by comparing the control carrier wave with the output expected value $v_k^*$, the required output phase voltage $v_k$ can be synthesized. The synthesis of the input current can be realized by adjusting the duration of the first and second linear carrier waves, which is described specifically as follows.

Figure 8:
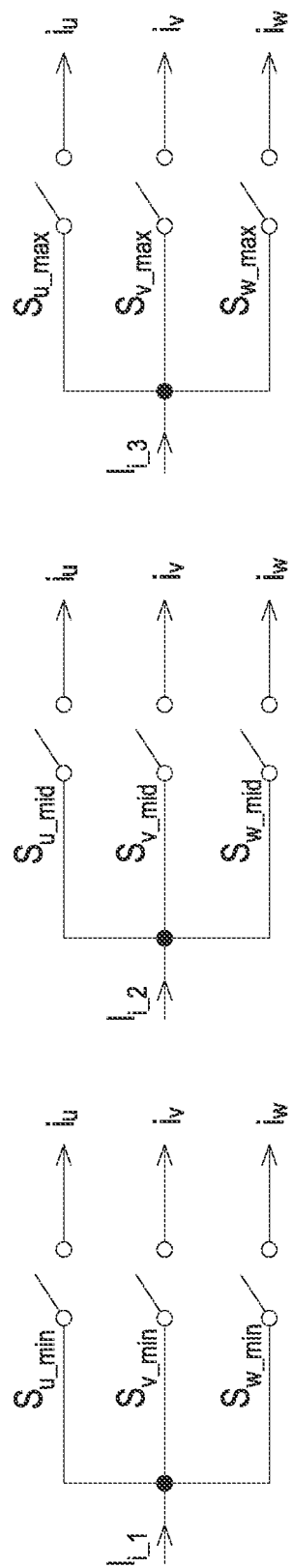
FIG. 8 shows the relations between the input phase currents and the output phase currents and the equivalent circuit of the bidirectional switches.

FIG. 8 shows the relations between the input phase currents and the output phase currents and the equivalent circuit of the bidirectional switches. Among the input phase currents $i_a$, $i_b$ and $i_c$ in FIG. 2, the input phase currents respectively corresponding to the minimum voltage $E_{i\_min}$, the intermediate voltage $E_{i\_mid}$ and the maximum voltage $E_{i\_max}$ are the input phase currents $I_{i\_1}$, $I_{i\_2}$ and $I_{i\_3}$ in FIG. 8 respectively. As shown in FIG. 8, when the base voltage command $E_{base}$ is in the positive interval (i.e., $E_{base}=E_{i\_max}$), the input phase currents $I_{i\_1}$, $I_{i\_2}$ and $I_{i\_3}$ are expressed as:

$$I_{i\_1} = \frac{1}{T_{sw1}}(T_{2u\_min} \cdot i_u + T_{2v\_min} \cdot i_v + T_{2w\_min} \cdot i_w) \quad (9)$$

$$I_{i\_2} = \frac{1}{T_{sw1}}(T_{1u\_mid} \cdot i_u + T_{1v\_mid} \cdot i_v + T_{1w\_mid} \cdot i_w)$$

$$I_{i\_3} = (1/T_{sw1})[$$

$$(T_{1u\_max} + T_{2u\_max}) \cdot i_u + (T_{1v\_max} + T_{2v\_max}) \cdot i_v + (T_{1w\_max} + T_{2w\_max}) \cdot i_w].$$

By substituting equation (5) into equation (9), it is derived that:

$$I_{i\_1} = \frac{-(1-\alpha_1)}{V_{dc2}}(v_u^* \cdot i_u + v_v^* \cdot i_v + v_w^* \cdot i_w) \quad (10)$$

$$I_{i\_2} = \frac{-\alpha_1}{V_{dc1}}(v_u^* \cdot i_u + v_v^* \cdot i_v + v_w^* \cdot i_w)$$

$$I_{i\_3} = (v_u^* \cdot i_u + v_v^* \cdot i_v + v_w^* \cdot i_w)\left(\frac{\alpha_1}{V_{dc1}} + \frac{(1-\alpha_1)}{V_{dc2}}\right)$$

Equation (10) can be rearranged to be:

$$v_u^* \cdot i_u + v_v^* \cdot i_v + v_w^* \cdot i_w = \frac{I_{i\_3}V_{dc1}V_{dc2}}{V_{dc1}V_{dc2} + (1-\alpha_1)V_{dc1}}. \quad (11)$$

With regard to control the power factor of the input voltage and the input current to equal 1 (i.e., control the input voltage and the input current to be in phase), the equation (11) is substituted into the equation (10), and the input phase current is replaced by the input phase voltage. Therefore, $\alpha_1$ can be acquired as:

$$\alpha_1 = \frac{-V_{dc1}E_{i\_mid}}{(V_{dc2} - V_{dc1})E_{i\_mid} + E_{i\_max}V_{dc2}} \quad (12)$$

Through substituting $\alpha_1$ of equation (12) into the control carrier wave of FIG. 7A, the required output voltage and input current with a power factor of 1 can be synthesized when the base voltage command $E_{base}$ is in the positive interval (i.e., $E_{base}=E_{i\_max}$).

On the other hand, when the base voltage command $E_{base}$ is in the negative interval (i.e., $E_{base}=E_{i\_min}$), the input phase currents $I_{i\_1}$, $I_{i\_2}$ and $I_{i\_3}$ are expressed as:

$$I_{i\_1} = (1/T_{sw2})[(T_{3u\_min} + T_{4u\_min}) \cdot i_u + \quad (13)$$

$$(T_{3v\_min} + T_{4v\_min}) \cdot i_v + (T_{3w\_min} + T_{4w\_min}) \cdot i_w]$$

$$I_{i\_2} = \frac{1}{T_{sw2}}(T_{3u\_mid} \cdot i_u + T_{3v\_mid} \cdot i_v + T_{3w\_mid} \cdot i_w)$$

$$I_{i\_3} = \frac{1}{T_{sw2}}(T_{4u\_max} \cdot i_u + T_{4v\_max} \cdot i_v + T_{4w\_max} \cdot i_w).$$

By substituting equation (7) into equation (13), it is derived that:

$$I_{i\_1} = (v_u^* \cdot i_u + v_v^* \cdot i_v + v_w^* \cdot i_w)\left(\frac{\alpha_2}{V_{dc3}} + \frac{(1-\alpha_2)}{V_{dc4}}\right) \quad (14)$$

$$I_{i\_2} = \frac{-\alpha_2}{V_{dc3}}(v_u^* \cdot i_u + v_v^* \cdot i_v + v_w^* \cdot i_w)$$

$$I_{i\_3} = \frac{-(1-\alpha_2)}{V_{dc4}}(v_u^* \cdot i_u + v_v^* \cdot i_v + v_w^* \cdot i_w)$$

Equation (14) can be rearranged to be:

$$v_u^* \cdot i_u + v_v^* \cdot i_v + v_w^* \cdot i_w = \frac{I_{i\_1}V_{dc3}V_{dc4}}{V_{dc3}V_{dc4} + (1-\alpha_2)V_{dc3}}. \quad (15)$$

With regard to control the power factor of the input voltage and the input current to equal 1 (i.e., control the input voltage and the input current to be in phase), the equation (15) is substituted into the equation (14), and the input phase current is replaced by the input phase voltage. Therefore, $\alpha_2$ can be acquired as:

$$\alpha_2 = \frac{-V_{dc3}E_{i\_mid}}{(V_{dc4} - V_{dc3})E_{i\_mid} + E_{i\_max}V_{dc4}}. \quad (16)$$

Through substituting $\alpha_2$ of equation (16) into the control carrier wave of FIG. 7B, the required output voltage and input current with a power factor of 1 can be synthesized when the base voltage command $E_{base}$ is in the negative interval (i.e., $E_{base}=E_{i\_min}$).

In an embodiment, in order to decrease the times of switching the bidirectional switch for reducing the switching loss, a zero sequence voltage can be injected into the output expected values of three phases, which is described specifically as follows.

When the base voltage command $E_{base}$ is in the positive interval (i.e., $E_{base}=E_{i\_max}$), on the basis of FIG. 7A, FIG. 9A schematically shows the waveforms of the control carrier wave, the three-phase output expected values $v_u^*$, $v_v^*$ and $v_w^*$ and the output phase voltages $v_u$, $v_v$ and $v_w$. The zero sequence voltage $v_z$ is defined as:

$$v_z = E_{i\_max} - \max(v_u^*, v_v^*, v_w^*) \quad (17).$$

By adding the zero sequence voltage $v_z$ to each of the three-phase output expected values $v_u^*$, $v_v^*$ and $v_w^*$ respectively, the three-phase output expected values $v_u^{}$, $v_v^{}$ and $v_w^{**}$ after zero sequence injection are acquired as:

$$v_u^{**} = v_u^* + v_z$$

$$v_v^{**} = v_v^* + v_z$$

$$v_w^{**} = v_w^* + v_z \quad (18)$$

FIG. 9B shows the relations between the three-phase output expected values $v_u^{}$, $v_v^{}$ and $v_w^{**}$ after zero sequence injection and the control carrier wave. As shown in FIG. 9B, among the bidirectional switches $S_{u\_max}$, $S_{u\_mid}$ and $S_{u\_min}$ corresponding to the output phase voltage $v_u$, the bidirectional switch $S_{u\_max}$ is maintained in the on state in one switching cycle $T_{sw1}$. Therefore, the switching times of the bidirectional switch are decreased, and the switching loss is reduced.

According to the described principle of zero sequence voltage injection, when the controller 14 determines that the base voltage command $E_{base}$ is in the positive interval (i.e., $E_{base}=E_{i\_max}$), the controller 14 calculates the average voltage values of all the output phase voltage $v_u$, $v_v$ and $v_w$, and selects a maximum value of all the average voltage values as a reference base voltage. Further, the controller 14 calculates a voltage difference between the maximum voltage $E_{i\_max}$ and the reference base voltage as a shift voltage (i.e., the zero sequence voltage). Then, the shift voltage is added to each of the output phase voltages $v_u$, $v_v$ and $v_w$ respectively, so as to obtain the output expected values $v_u^{}$, $v_v^{}$ and $v_w^{**}$.

When the base voltage command $E_{base}$ is in the negative interval (i.e., $E_{base}=E_{i\_min}$), on the basis of FIG. 7B, FIG. 10A schematically shows the waveforms of the control carrier wave, the three-phase output expected values $v_u^*$, $v_v^*$ and $v_w^*$ and the output phase voltages $v_u$, $v_v$ and $v_w$. The zero sequence voltage $v_z$ is defined as:

$$v_z = E_{i\_min} - \min(v_u^*, v_v^*, v_w^*) \quad (19).$$

By adding the zero sequence voltage $v_z$ to each of the three-phase output expected values $v_u^*$, $v_v^*$ and $v_w^*$ respectively, the three-phase output expected values $v_u^{}$, $v_v^{}$ and $v_w^{}$ after zero sequence injection are acquired. FIG. 10B shows the relations between the three-phase output expected values $v_u^{}$, $v_v^{}$ and $v_w^{}$ after zero sequence injection and the control carrier wave. As shown in FIG. 10B, among the bidirectional switches $S_{w\_max}$, $S_{w\_mid}$ and $S_{w\_min}$ corresponding to the output phase voltage $v_w$, the bidirectional switch $S_{w\_max}$ is maintained in the on state in one switching cycle $T_{sw2}$. Therefore, the switching times of the bidirectional switch are decreased, and the switching loss is reduced.

According to the described principle of zero sequence voltage injection, when the controller 14 determines that the base voltage command $E_{base}$ is in the negative interval (i.e., $E_{base}=E_{i\_min}$), the controller 14 calculates the average voltage values of all the output phase voltage $v_u$, $v_v$ and $v_w$, and selects a minimum value of all the average voltage values as a reference base voltage. Further, the controller 14 calculates a voltage difference between the minimum voltage $E_{i\_min}$ and the reference base voltage as a shift voltage (i.e., the zero sequence voltage). Then, the shift voltage is subtracted from each of the output phase voltages $v_u$, $v_v$ and $v_w$ respectively, so as to obtain the output expected values $v_u^{}$, $v_v^{}$ and $v_w^{**}$.

Figure 11A:
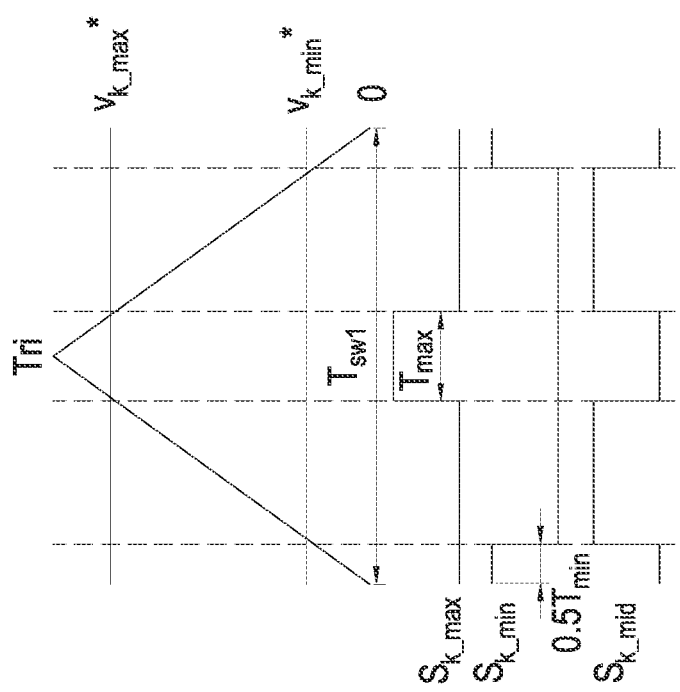
FIG. 11A and FIG. 11B schematically show the waveforms of the control carrier wave and the control signals of the bidirectional switches in the case of the first and second linear carrier waves having the same cycle variation and voltage variation.
Figure 11B:
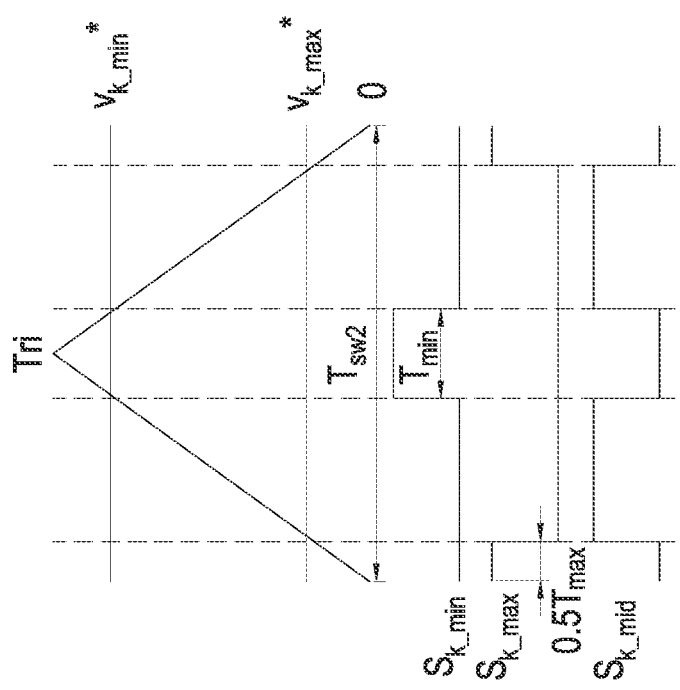

In the above embodiments, the first and second linear carrier waves of the control carrier wave have unequal cycle variation and voltage variation, but the present disclosure is not limited thereto. In another embodiment, for ease of implementing and controlling, the first and second linear carrier waves of the control carrier wave have the same cycle variation and voltage variation. FIG. 11A and FIG. 11B schematically show the waveforms of the control carrier wave and the control signals of the bidirectional switches in the case of the first and second linear carrier waves having the same cycle variation and voltage variation. In FIG. 11A and FIG. 11B, the control carrier wave is a symmetrical triangular wave, Tri is the amplitude of the control carrier wave, $T_{max}$ is the total turning-on time of the bidirectional switch $S_{k\_max}$ in one switching cycle, and $T_{min}$ is the total turning-on time of the bidirectional switch $S_{k\_min}$ in one switching cycle.

When the base voltage command $E_{base}$ in the positive interval (i.e., $E_{base}=E_{i\_max}$), the turning-on time $T_{max}$ and $T_{min}$ of the bidirectional switches $S_{k\_max}$ and $S_{k\_min}$ corresponding to any output phase can be acquired according to equation (5). As shown in FIG. 11A, the voltage commands $v_{k\_max}^*$ and $v_{k\_min}^*$ are compared with the control carrier wave. When the voltage command $v_{k\_max}^*$ is less than the control carrier wave, the bidirectional switch $S_{k\_max}$ is controlled to be turned on. When the voltage command $v_{k\_max}^*$ is greater than the control carrier wave, the bidirectional switch $S_{k\_max}$ is controlled to be turned off. When the voltage command $v_{k\_min}^*$ is greater than the control carrier wave, the bidirectional switch $S_{k\_min}$ is controlled to be turned on. When the voltage command $v_{k\_min}^*$ is less than the control carrier wave, the bidirectional switch $S_{k\_min}$ is controlled to be turned off. It is derived from equation 5) that:

$$v_{k\_max}^* = Tri \cdot \left(1 - \frac{\alpha_1(v_k^{} - E_{i\_mid})}{E_{i\_max} - E_{i\_mid}} - \frac{(1-\alpha_1)(v_k^{} - E_{i\_mid})}{E_{i\_max} - E_{i\_min}}\right) \quad (20)$$

$$v_{k\_min}^* = Tri \cdot \left(\frac{(1-\alpha_1)(E_{i\_mid} - v_k^{**})}{E_{i\_max} - E_{i\_mid}}\right)$$

Through comparing the voltage commands $v_{k\_max}^*$ and $v_{k\_min}^*$ with the control carrier wave, the control signals of the bidirectional switches $S_{k\_max}$ and $S_{k\_min}$ is generated. The bidirectional switch $S_{k\_mid}$ is turned on when the bidirectional switches $S_{k\_max}$ and $S_{k\_min}$ are both turned off, which is expressed with XNOR gate as:

$$S_{k\_mid} = \overline{S_{k\_max} \oplus S_{k\_min}} \quad (21)$$

On the other hand, when the base voltage command $E_{base}$ in the negative interval (i.e., $E_{base}=E_{i\_min}$), the turning-on time $T_{max}$ and $T_{min}$ of the bidirectional switches $S_{k\_max}$ and $S_{k\_min}$ corresponding to any output phase can be acquired according to equation (7). As shown in FIG. 11B, the voltage commands $v_{k\_max}^*$ and $v_{k\_min}^*$ are compared with the control carrier wave. When the voltage command $v_{k\_min}^*$ is less than the control carrier wave, the bidirectional switch $S_{k\_min}$ is controlled to be turned on. When the voltage command $v_{k\_min}^*$ is greater than the control carrier wave, the bidirectional switch $S_{k\_min}$ is controlled to be turned off. When the voltage command $v_{k\_max}^*$ is greater than the control carrier wave, the bidirectional switch $S_{k\_max}$ is controlled to be turned on. When the voltage command $v_{k\_max}^*$ is less than the control carrier wave, the bidirectional switch $S_{k\_max}$ is controlled to be turned off. It is derived from equation (7) that:

$$v_{k\_min}^* = Tri \cdot \left(1 - \frac{\alpha_2(-v_k^{} + E_{i\_mid})}{E_{i\_max} - E_{i\_mid}} - \frac{(1-\alpha_2)(-v_k^{} + E_{i\_min})}{E_{i\_max} - E_{i\_min}}\right) \quad (22)$$

$$v_{k\_max}^* = Tri \cdot \left(\frac{(1-\alpha_2)(-E_{i\_min} + v_k^{**})}{E_{i\_max} - E_{i\_min}}\right)$$

Through comparing the voltage commands $v_{k\_max}^*$ and $v_{k\_min}^*$ with the control carrier wave, the control signals of the bidirectional switches $S_{k\_max}$ and $S_{k\_min}$ is generated. The bidirectional switch $S_{k\_mid}$ is turned on when the bidirectional switches $S_{k\_max}$ and $S_{k\_min}$ are both turned off.

From the above descriptions, the present disclosure provides a matrix power conversion device and a control method thereof. Through the operation of the plurality of bidirectional switches in the matrix power conversion device, the AC power at the input side is directly converted into the AC power at the output side. There is no need to dispose an additional DC capacitor as relay buffer. Consequently, by the matrix power conversion device and the control thereof of the present disclosure, the matrix power conversion device with smaller volume, better efficiency and longer lifespan is realized. In addition, the present disclosure utilizes carrier wave to control the bidirectional switches of the matrix power conversion device, so as to realize the synthesis of output voltage and output current. Moreover, in the present disclosure, the zero sequence voltage is injected into the output expected values of three phases, thereby decreasing the switching times of the bidirectional switch and reducing the switching loss. Further, in the present disclosure, the first and second linear carrier waves of the control carrier wave have equal or unequal cycle variation and voltage variation. For example, the control carrier wave is a symmetrical triangular wave for ease of implementing and controlling.

While the disclosure has been described in terms of what is presently considered to be the most practical and preferred embodiments, it is to be understood that the disclosure needs not be limited to the disclosed embodiment.

What is claimed is:

1. A matrix power conversion device, coupled between a three-phase input power and a motor, wherein the matrix power conversion device comprises:
   a plurality of three-phase switching modules, switching the three-phase input power to generate a three-phase output power, wherein each of the plurality of three-phase switching modules comprises a plurality of bidirectional switches, each of the plurality of bidirectional switches in each of the plurality of three-phase switching modules is connected to a corresponding input phase voltage of the three-phase input power, and each of the plurality of three-phase switching modules outputs a corresponding output phase voltage of the three-phase output power; and
   a controller, acquiring all input phase voltages of the three-phase input power, and determining a maximum voltage, an intermediate voltage and a minimum voltage among all the input phase voltages to acquire a waveform of a control carrier wave in a switching cycle;
   wherein the controller acquires output expected values corresponding to all output phase voltages of the three-phase output power;
   wherein the controller compares the waveform of the control carrier wave with all the output expected values respectively for acquiring a turning-on time of each of the plurality of bidirectional switches;
   wherein according to the turning-on time of each of the plurality of bidirectional switches, the controller controls the matrix power conversion device to switch the three-phase input power so as to change the three-phase output power for driving the motor,
   wherein the waveform of the control carrier wave comprises a first linear carrier wave and a second linear carrier wave, and the controller is further configured to:
   acquire a time ratio value according to the maximum voltage, the intermediate voltage and the minimum voltage;
   multiply the switching cycle by the time ratio value to acquire a first switching interval of the switching cycle; and
   subtract the first switching interval from the switching cycle to acquire a second switching interval of the switching cycle,
   wherein the first switching interval is a cycle variation of the first linear carrier wave, and the second switching interval is a cycle variation of the second linear carrier wave, wherein the controller is further configured to:
   select one of the input phase voltages with the largest absolute voltage value to be a base voltage command; and
   identify whether the base voltage command is positive or negative, and determine a voltage variation of the first linear carrier wave and a voltage variation of the second linear carrier waves according to identifying result,
   wherein if the controller identifies that the base voltage command is positive, the controller is further configured to:
   calculate a first voltage difference between the maximum voltage and the intermediate voltage;
   calculate a second voltage difference between the maximum voltage and the minimum voltage; and calculate the time ratio value according to the first voltage difference, the second voltage difference, the intermediate voltage and the minimum voltage, wherein when the base voltage command is positive, the first voltage difference is the voltage variation of the first linear carrier wave, and the second voltage difference is the voltage variation of the second linear carrier wave, wherein a slope of the first linear carrier wave is negative, and a slope of the second linear carrier wave is positive.

2. The matrix power conversion device according to claim 1, wherein if the controller identifies that the base voltage command is positive, the controller is further configured to:

retrieve a time of the first linear carrier wave being greater than all the output expected values respectively, so as to acquire intermediate duty ratios corresponding to all the output expected values respectively;

retrieve a first time of the first linear carrier wave being less than all the output expected values respectively, and retrieve a second time of the second linear carrier wave being less than all the output expected values respectively;

add the first time to the corresponding second time, so as to acquire maximum duty ratios corresponding to all the output expected values respectively; and retrieve a time of the second linear carrier wave being greater than all the output expected values respectively, so as to acquire minimum duty ratios corresponding to all the output expected values respectively.

3. The matrix power conversion device according to claim 2, wherein a turning-on time of the bidirectional switches corresponding to the intermediate voltage are corresponding to the intermediate duty ratios respectively, a turning-on time of the bidirectional switches corresponding to the maximum voltage are corresponding to the maximum duty ratios respectively, and a turning-on time of the bidirectional switches corresponding to the minimum voltage are corresponding to the minimum duty ratios respectively.

4. The matrix power conversion device according to claim 1, wherein if the controller identifies that the base voltage command is negative, the controller is further configured to:

calculate a third voltage difference between the intermediate voltage and the minimum voltage;

calculate a fourth voltage difference between the maximum voltage and the minimum voltage; and calculate the time ratio value according to the third voltage difference, the fourth voltage difference, the intermediate voltage and the minimum voltage, wherein when the base voltage command is negative, the third voltage difference is the voltage variation of the first linear carrier wave, and the fourth voltage difference is the voltage variation of the second linear carrier wave.

5. The matrix power conversion device according to claim 4, wherein if the controller identifies that the base voltage command is negative, the controller is further configured to:

retrieve a first time of the first linear carrier wave being greater than all the output expected values respectively, and retrieve a second time of the second linear carrier wave being greater than all the output expected values respectively;

add the first time to the corresponding second time, so as to acquire minimum duty ratios corresponding to all the output expected values respectively;

retrieve a time of the first linear carrier wave being less than all the output expected values respectively, so as to acquire intermediate duty ratios corresponding to all the output expected values respectively; and retrieve a time of the second linear carrier wave being less than all the output expected values respectively, so as to acquire maximum duty ratios corresponding to all the output expected values respectively.

6. The matrix power conversion device according to claim 5, wherein a turning-on time of the bidirectional switches corresponding to the intermediate voltage are corresponding to the intermediate duty ratios respectively, a turning-on time of the bidirectional switches corresponding to the maximum voltage are corresponding to the maximum duty ratios respectively, and a turning-on time of the bidirectional switches corresponding to the minimum voltage are corresponding to the minimum duty ratios respectively.

7. The matrix power conversion device according to claim 1, wherein if the controller identifies that the base voltage command is positive, the controller is further configured to:

calculate average voltage values of all the output phase voltages;

select a maximum value of all the average voltage values as a reference base voltage;

calculate a voltage difference between the maximum voltage and the reference base voltage as a shift voltage; and add the shift voltage to each of the average voltage values, so as to acquire the output expected values.

8. The matrix power conversion device according to claim 1, wherein if the controller identifies that the base voltage command is negative, the controller is further configured to:

calculate average voltage values of all the output phase voltages;

select a minimum value of all the average voltage values as a reference base voltage;

calculate a voltage difference between the minimum voltage and the reference base voltage as a shift voltage; and subtract the shift voltage from each of the average voltage values, so as to acquire the output expected values.

9. The matrix power conversion device according to claim 1, wherein the controller further retrieves each of the input phase voltages of the three-phase input power according to a preset phase, and the preset phase is 30 degrees or $\pi/6$ radians.

10. The matrix power conversion device according to claim 1, wherein the output expected values are average voltage values corresponding to the output phase voltages respectively.

11. A control method for a matrix power conversion device, wherein the matrix power conversion device comprises a plurality of three-phase switching modules configured to switch the three-phase input power to generate a three-phase output power, each of the plurality of three-phase switching module comprises a plurality of bidirectional switches, each of the plurality of bidirectional switches in each of the plurality of three-phase switching modules is connected to a corresponding input phase voltage of the three-phase input power, each of the plurality of three-phase switching modules outputs a corresponding output phase voltage of the three-phase output power, wherein the control method comprises:

acquiring all input phase voltages of the three-phase input power;

determining a maximum voltage, an intermediate voltage and a minimum voltage among all the input phase voltages to acquire a waveform of a control carrier wave in a switching cycle;

acquiring output expected values corresponding to all output phase voltages of the three-phase output power respectively;

comparing the waveform of the control carrier wave with all the output expected values respectively for acquiring a turning-on time of each of the plurality of bidirectional switches; and switching the three-phase input power to change the three-phase output power for driving a motor according to the turning-on time of each of the plurality of bidirectional switches, wherein the waveform of the control carrier wave comprises a first linear carrier wave and a second linear carrier wave, and the control method further comprises:

acquiring a time ratio value according to the maximum voltage, the intermediate voltage and the minimum voltage;

multiplying the switching cycle by the time ratio value to acquire a first switching interval of the switching cycle; and subtracting the first switching interval from the switching cycle to acquire a second switching interval of the switching cycle, wherein the first switching interval is a cycle variation of the first linear carrier wave, and the second switching interval is a cycle variation, of the second linear carrier wave, wherein the control method further comprises:

selecting one of the input phase voltages with the largest absolute voltage value to be a base voltage command; and identifying whether the base voltage command is positive or negative, and determining a voltage variation of the first linear carrier wave and a voltage variation of the second linear carrier waves according to identifying result, wherein if it is identified that the base voltage command is positive, the control method further comprises:

calculating a first voltage difference between the maximum voltage and the intermediate voltage:

calculating a second voltage difference between the maximum voltage and the minimum voltage; and calculating the time ratio value according to the first voltage difference, the second voltage difference, the intermediate voltage and the minimum voltage, wherein when the base voltage command is positive, the first voltage difference is the voltage variation of the first linear carrier wave, and the second voltage difference is the voltage variation of the second linear carrier wave; wherein a slope of the first linear carrier wave is negative, and a slope of the second linear carrier wave is positive.

* * * * *